Figure 1:
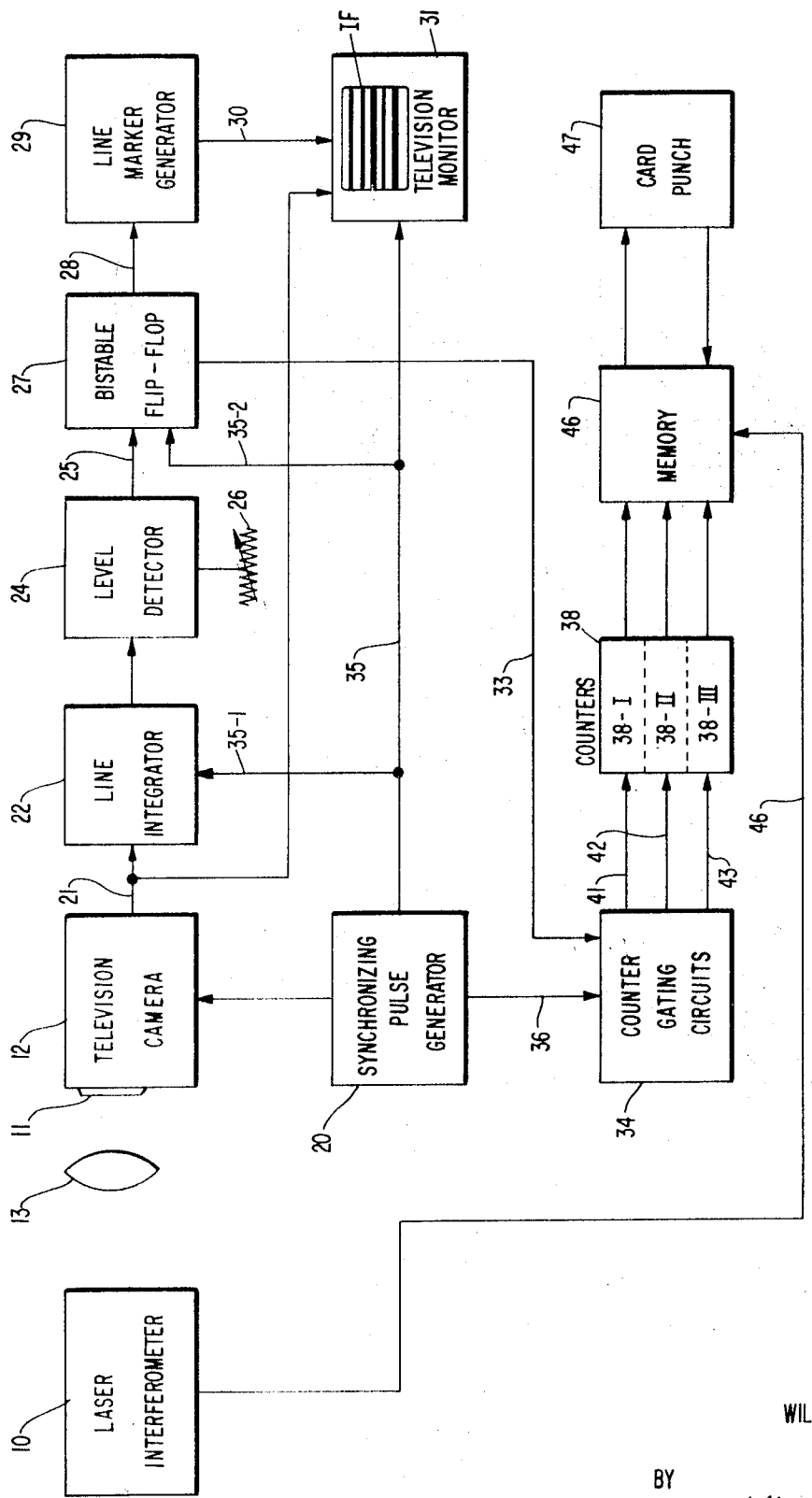

United States Patent

Ryan

[15] 3,644,046
[45] Feb. 22, 1972

[54] METHOD AND APPARATUS FOR MEASURING INTERFEROMETER FRINGE PATTERNS

[72] Inventor: William H. Ryan, Toledo, Ohio
[73] Assignee: Owens-Illinois, Inc.
[22] Filed: Apr. 2, 1969
[21] Appl. No.: 812,840

[52] U.S. Cl. .............................................356/106, 178/6.8
[51] Int. Cl. ....................................., G01b 9/02, H04n 3/00
[58] Field of Search..................................356/106; /; 178/6.8

[56] References Cited

UNITED STATES PATENTS 2,848,921  8/1958  Koulikovitch ..........................356/106

OTHER PUBLICATIONS

" Procedure For Evaluating the Small Object Detecting Capability of an Electron- Scanned Image Tube" ; JOSA; Vol 49, No. 12; L. Glatt.
" Spectroscopic Application of Television Technology" ; JOSA; Vol 50, 1960; Lovell.

Primary Examiner—Ronald L. Wibert
Assistant Examiner—Conrad Clark
Attorney—Richard D. Heberling and E. J. Holler

[57] ABSTRACT

Method and apparatus for accurate automatic measurement of fringe pattern shift in an optical interferometer. Fringe patterns from an interferometer are imaged upon the photosensitive target of a television camera with fringe line patterns parallel to horizontal scanning lines or scanning raster of the TV camera. Scan line video signals from the camera are integrated and intensity detected to produce a corresponding binary fringe signal for controlling a bistable circuit which is caused to be in one or the other of its stable states according to whether the video signal from the TV camera is above or below, respectively, a selected threshold level, e.g. presence or absence of an interference fringe line during a line scan. Counters count the number of scanning lines occuring during the time the bistable circuit is in each of its states, respectively. Thus, the scanning lines between fringes as well as those covered by each fringe can be counted for as many fringes as necessary to determine fringe positions. The center of a fringe may be located by dividing the number of scanning lines per fringe by two. Consult the specification for further features and details.

15 Claims, 2 Drawing Figures

METHOD AND APPARATUS FOR MEASURING INTERFEROMETER FRINGE PATTERNS

The present invention relates in general to methods and apparatus for automatically measuring the fringe pattern of an optical interferometer and more particularly to method and apparatus for scanning a fringe pattern as imaged on the photosensitive target of a television camera and electronically processing video signals produced thereby.

In the past operators of optical interferometers made visual approximations of fringe pattern shifts. While the prior art discloses use of television cameras and electronic processing of video signals to obtain measurements of fringe patterns or other optical images, the present invention is an improvement over such systems in achieving a degree of accuracy, resolution and speed not heretofore available.

Objects of the invention include the provision of improved methods and apparatus for accurate measurement of fringe pattern shifts; the provision of an improved system of electronically processing fringe pattern signals and an improved system of measuring rate of change of position and position of fringes.

Figure 2:
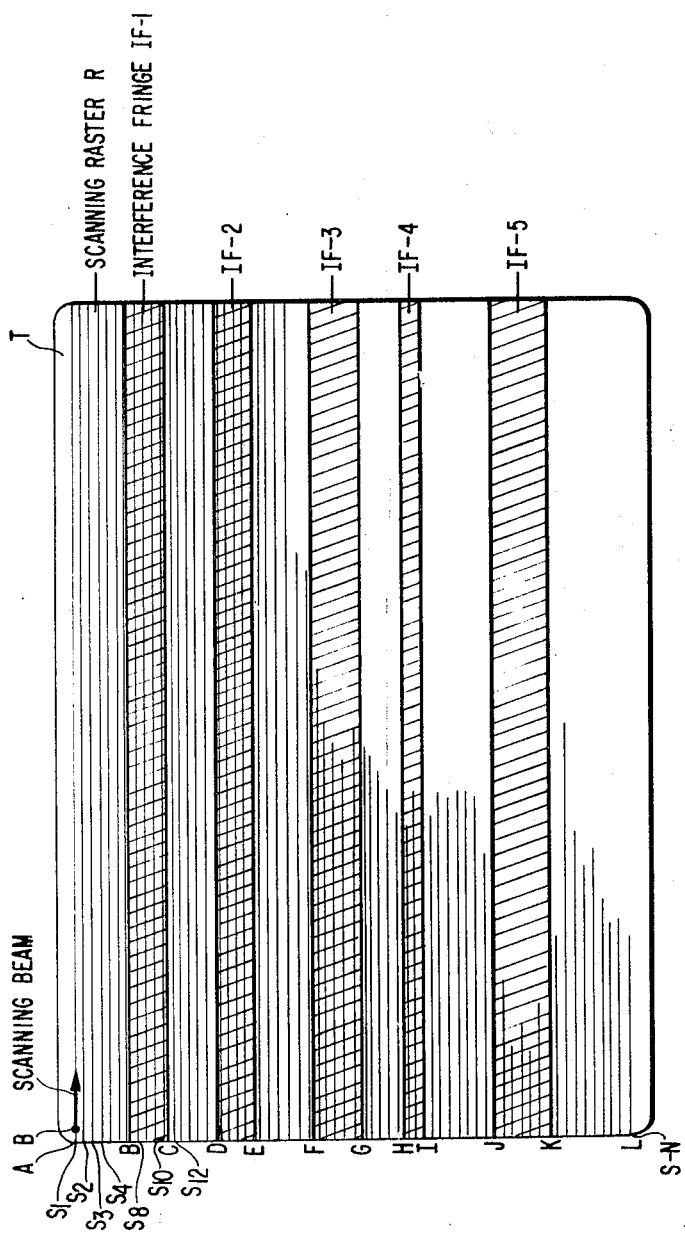

The foregoing as well as other objects, advantages and features of the invention will become apparent from the following specification and accompanying drawings wherein, FIG. 1 is a block diagram of electrical apparatus incorporating the invention and;

FIG. 2 is a diagrammatic illustration of a fringe pattern and scanning raster for purposes of explaining the invention.

With reference to FIG. 1, a linear fringe pattern from optical interferometer 10 is imaged or focused on the faceplate 11 of television camera 12 by lens system 13. Interferometer 10 may be of any well-known type as disclosed in Saunders U.S. Pat. Nos. 3,034,397 and 3,031,914, Granger U.S. Pat. No. 3,374,704.

Such optical interferometer apparatus produce fringe patterns having linear interference fringes proportional to minute displacements, or departures from length of an object as compared to reference position or a standard length. Such laser interferometers use a beam splitter to split a laser beam into two beams of equal intensity, one beam traversing a known or reference path or standard, and the other traversing an unknown path. Such beams, when recombined produce a series of parallel lines which are alternately bright and dark, corresponding, respectively, to the superposition of crest and crest, or crest and trough, with interference fringes, fringe separation and fringe shifts being proportional to relative phase displacements in the light waves. Measurements of these parameters of the fringe patterns produce information as to differences of path length or length modulation, to a fraction of a millionth of an inch (such measurements are related to the wavelengths of light).

The present invention is not concerned with the manner of producing such fringe patterns but only with the accurate measurement and resolution of such fringe patterns, so a detailed description of such apparatus is not necessary. Where such optical interferometric apparatus is used for measuring successive objects, or dimensioned changes in an object as due, say, to temperature expansion and/or contractions, it may be desirable that identity of the object and/or parameters be conveyed to the readout system disclosed herein to provide correlation with fringe pattern measurements. Thus, it may be desirable to deliver identity signals to the counter/memory system (described later herein) identifying a particular object, parameter, etc., which may be delivered as a part of the readout of the apparatus.

SCANNING OF FRINGE PATTERN

With reference to FIG. 2, there is diagrammatically illustrated a linear interference fringe pattern constituted by interference fringe lines $IF_1$, $IF_3$, $IF_4$, and $IF_5$, which, for purposes of explanation, are shown as having different widths as well as different separation or spacing between interference fringes $IF_1$, $IF_2$, etc., it being appreciated that for a nonvarying entity being measured by the optical interferometer, the width of the fringe lines as well as the space between lines may be uniform, respectively. This fringe pattern shift is focused or imaged on the photosensitive target T behind faceplate 11 of a conventional television camera such as the high-resolution vidicon television camera 12 of FIG. 1. In a typical example, the scanning beam B of the camera is operated with approximately 1,200 scanning lines $S_1$, $S_2$, $S_3$, $S_4$....$Sn$ ($n$=1,200) with no interlace.

An important feature of the invention is that each scan line S on target T as traversed by scanning electron beam B is parallel to fringe lines $IF_1$, $IF_2$...$IF_5$. In this way, video signals produced during each scan line S have amplitudes proportional to presence or absence of a fringe line along the scan lines, respectively. Thus, at point A, scan line $S_1$, the video signal produced as scanning beam B traverses the path defined by scan line $S_1$ has a high amplitude and will be essentially uniform along this path. In fact all scan lines S between points A and B ($S_1$–$S_7$, inclusive), produce video signals of a character indicating the absence of a fringe line (or, more accurately, the video signal is above the threshold level of level detector 24). At point B, however, the next scan line $S_8$ (for example) produces video signals which are significantly different in amplitude than the amplitude of video signals produced during scan of lines $S_1$–$S_7$ which is indicative of the start of interference fringe $IF_1$. It will be appreciated that a point in a gradual transition from light to dark or from one color to another present in the fringe pattern is selected by the level detector 24. The next three succeeding scan lines $S_9$–$S_{11}$ produce video signals of like amplitude so that all scan lines between B and C produce video signals of significantly different amplitude (lower) than are the video signals produced between A and B. Thus, the number of scan lines between B and C is a measure of the effective width of interference fringe $IF_1$. Similarly, the number of scan lines between C and D is a measure of the effective distance or separation between interference fringes $IF_1$ and $IF_2$. From the foregoing it will be apparent that the number of scan lines between D and E is a measure of interference fringe $IF_2$; the number of scan lines between E and F is a measure of the distance or separation between interference fringes $IF_2$ and $IF_3$; the number of scan lines between F and G is a measure of the interference fringe $IF_3$... etc., throughout raster R. A selected degree of change in amplitude of video signal at any scan line is an indication of the effective start point of a fringe line or the effective end of a fringe line and beginning of the space or separation between fringe lines. Thus, by counting scan lines between changes in video signal an accurate measure is obtained of the fringe pattern. Moreover, the center of a fringe may be located by halving the number of scan lines counted during a fringe.

The degree of resolution and accuracy is largely determined by the number of scan lines S in raster R, the greater the number of scan lines for a given fringe pattern image in the target area, the greater the degree of accuracy and resolution in rounded numbers with approximately 1,000 scan lines it is possible to determine the position of each fringe with an accuracy of one part in 1,000. To provide a continuous data at least three full fringes must be used. Thus there are approximately 300 scan lines between each fringe giving an accuracy of one-three-hundredth of one fringe. For light of 6,328 a. the distance between fringes corresponds to a change in path length of 3,164 a. Therefore the device has an accuracy of about 10 a. or better.

VIDEO SIGNAL PROCESSING

As described above, the fringe pattern from interferometer 10 is focused on target T of high-resolution vidicon television camera 12. Camera 12 is operated with approximately 1,000 scanning lines wit no interlace. Television synchronizing signals (horizontal synchronizing pulses, vertical synchronizing pulses, horizontal drive pulses, blanking pulses, etc.) for operating the camera 12 are supplied by television synchronizing pulse generator 20 which may be of the general type disclosed in my Pat. application Ser. No. 602,098 filed Dec. 15, 1966 now Pat. 3,487,166, or any commercial television signal generator. Video signals on line 21 as produced during each horizontal line scan S by beam B are integrated by line integrator 22 so that the output signal on line 23 is a signal having an amplitude proportional to the average intensity of light on individual photoconductive areas of target T scanned by the beam. The output of integrator 22 is applied to adjustable comparator or threshold level detector 24 which has its threshold level adjusted by adjustment of level set potentiometer 26. In purpose and effect line integrator 22 and threshold circuit 24 convert video signals from camera 12 to binary fringe signals and such signals may be processed with line index signals from synchronizing generator 20 to obtain the desired information. As described more fully hereinafter, the threshold level of detector 24 may, if desired, be adjusted with the aid of a marker generator and television monitor. However, such marker generator and television monitor are not necessary features and may be eliminated.

Upon completion of each horizontal line scan S the output of level detector 24 sets a bistable circuit 27, which may be a conventional JK flip-flop, to one stable state or the other stable state depending upon whether the integrated fringe intensity video signal is above or below the threshold level set for the comparison. Knowing which of line scans S are at the start or beginning of an interference fringe line IF and which of line scans S are at the termination of an interference fringe and the beginning of the space between interference fringe lines and the scan rate, it is possible to determine the information concerning fringe pattern shift in the fringe pattern projected on target T of the television camera.

Whenever the state of bistable flip-flop 27 is changed a signal is applied to line 28 and line marker generator 29. Line marker generator 29 produces line marker signals applied on line 30 to television monitor 31. Video signals from camera 12 are also applied to television monitor 31 by way of line 32 so that an image of the fringe pattern appears on the display screen of television monitor 31. Line marker signals on line 30 cause a series of light and dark spots to appear on the monitor display screen, such light and dark spots appearing on the next scanning line following the change of state of bistable flip-flop 27. These visual markers may be used to adjust level set potentiometer 26, e.g., the threshold level of level detector 24 and also aid in monitoring the operation of the system.

The output of bistable flip-flop 27 is also applied via line 33 to counter gate circuits 34, which also has applied thereto vertical synchronizing pulses on line 36 from synchronizing generator 20. The vertical synchronizing pulses on line 36 are used as indexes corresponding to scan lines, there being one pulse (or a known multiple thereof) on line 36 corresponding to each line of scan, respectively. In other words if there are 1,000 line scans ($n=1,000$) in scanning raster R, for each frame, there will be 1,000 indexes or scan line indicating pulses (or a known multiple thereof) applied to counter gating circuit 34 per frame or complete raster along with the output from bistable flip-flop 27.

Index pulses on line 36 as applied to counter gating circuits 34 may be selectively applied to counters 38 by means of output lines 41, 42 and 43 in any desired sequence. For example, indexes corresponding to the scan lines between B and C (FIG. 1) may be gated to counter 38-I; scan line indexes between C and D corresponding to a separation between interference fringe $IF_1$ and $IF_2$ may be gated on line 42 to counter 38-II; scan lines between D and E corresponding to the width of interference fringe $IF_2$ may be gated on line 43 to counter 38-III. If desired, the counter gating circuits may e operated to only pass indexes during scan of fringe separations to the counters to be counted; or only indexes occurring during scanning of fringes may be passed to counters 38. The numbers stored in counters 38 may then be transferred to memory 46 during television frame intervals from which the data may be applied in a nonsynchronous or in a synchronous fashion to card punch apparatus 47. It will be further appreciated that counter and gating circuits 34 may be used to manipulate the basic data contained on lines 36 and 33 in other fashions as for example, for producing a direct optical readout by integration of index pulses during a selected interval. Furthermore, while 3 counters are shown, it will be appreciated that more or less counters may be utilized as desired and, in fact, it is only necessary that one counter be used with the pulses on line 33 being used to transfer the counts in the counter to the memory 46 or other storage device.

With further reference to FIG. 1, it will be noted that synchronizing pulse generator 20 supplies synchronizing signals on line 35 to television monitor 31 and, as indicated above, these include the conventional synchronizing pulses such as the horizontal drive pulse, vertical drive pulse, composite blanking pulses, composite synchronizing pulses, horizontal synchronizing pulses, clamp pulses, clock pulses and the like, so that the television camera 12, synchronizing generator 20 lines 32 and 35 and television monitor 31 comprise a closed-circuit television system. The addition of line markers at the change in state of bistable circuit 27 is used to set up the level detector threshold and to aid in monitoring the operation of the system.

The synchronizing pulse generator 20 also has its horizontal framing pulses applied to line integrator 22 on line 35-I which resets line integrator 22 after each line scan. Moreover, pulses from synchronizing generator 20 are applied on line 35-II to bistable flip-flop 27 which pulses on line 35-II correspond to framing signals indicating the end of the frame or raster and resets same to start a new scan frame.

The interferometer 10 may be used to measure articles having parameters which may vary at timed intervals so if the data points are taken at the timed intervals the rate of change of position and the position of the fringes can be measured and recorded. Thus, a signal is produced at the interferometer 10 corresponding to the timed interval as for example a new article being measured as a part of a manufacturing process or a stepped temperature change signal. Such a signal may be applied on line 48 and applied to memory 46 as each measurement is made and stored in the memory along with the output from counters 38. In this connection, it will be appreciated that the television frame rate can be adjusted for any interval as for example, making a series of measurements in sequence at timed rates so that the rate of change of an object being measured, with temperature for example, may be recorded automatically.

From the above, it may be seen that there has been provided, in accordance with the present invention, a unique method and apparatus for automatically and accurately measuring interference fringe pattern shifts from an optical interferometer and although the invention has been shown in connection with a certain specific embodiment, it will be readily apparent to those skilled in the art that changes in form and arrangements of the parts may be made to suit requirements without departing from the spirit and scope of the invention.

I claim:

1. An interferometer apparatus comprising in combination
    an interferometer for producing linear optical fringe patterns,
    a television camera having a photosensitive target,
    means for imaging said linear fringe pattern on said target,
    said television camera having electron beam scanning means for scanning the image on said target at a selected scan rate, said scanning beam traversing paths parallel to the interference fringes of said fringe pattern,
    means for converting video signals produced during each line scan to a binary fringe signal corresponding to whether said electron beam scanning means is scanning the separation between fringe lines or a fringe line, respectively, and
    counter means for counting the number of scans made by said scanning beam during the time when a sequence of said binary fringe signals have the same binary significance.

2. The invention defined in claim 1 wherein said means for converting said video signals to binary fringe signals includes
means for integrating video signals from said television camera for each line scan, and
means for comparing integrated video signals with a reference, scan line for scan line, to produce an output from said comparing means only when said integrated video signal is above a selected value.

3. The invention defined in claim 2 including a bistable flip-flop circuit, means connecting said bistable flip-flop circuit to receive the output from said means for comparing, whereby the state of said bistable flip-flop means is changed from one stable state to the other stable state as the output from said means for comparing changes.

4. The invention defined in claim 3 including a gate circuit, and
means for applying the output from said bistable circuit to said gate circuit as one control signal therefore and for applying pulses corresponding to each line scan by said electron beam as index pulses, and
counter means controlled by said gate circuit for counting said index pulses passed by said gate circuit during the stable states of said bistable flip-flop circuit, respectively.

5. The invention defined in claim 4 including means for receiving the output of said counter and producing a record thereof, and means for conveying data indicative of a parameter of the article being measured by said interferometer to said means for producing a record whereby said parameter is recorded on said record with the output of said counter.

6. Apparatus for measuring a linear fringe line pattern, comprising
a television camera having a photosensitive element and electron beam means for line scanning said photosensitive element at a selected line scan rate within a frame time period,
means for projecting said linear fringe line pattern on said photosensitive element with the linear fringe lines of said fringe line pattern parallel to the scanning lines of said electron beam,
a bistable circuit having a first and a second stable state, said bistable circuit being shifted to its first stable state by a video signal from said television camera of a first selected intensity level, and to its second stable state by a video signal from said television camera of a second selected intensity level,
means for producing pulses corresponding to said selected line scan rate, and
counter means for counting the number of pulses at said selected scanning line rate occurring during the time said bistable circuit is in said first and said second stable states, respectively.

7. The invention defined by claim 6 wherein said counter means includes a plurality of counter circuits, and gate circuit means controlled by the output of said bistable circuit for sequentially connecting said counter circuits to receive the pulses occurring during the times said bistable circuit is in its respective states corresponding to lines scanned, and means for resetting said counter circuits at the end of each frame period.

8. Apparatus for measuring a line pattern composed of alternating linear dark portions and linear light portions separating said dark portions, comprising
means for scanning said line pattern a selected number of times in a direction parallel to the lines of said pattern so as to effectively divide said pattern into a plurality of lineal elements and produce a signal proportional to the average light intensity for each lineal element, respectively,
means for determining which of said sequences of said signals is above a selected level and producing a control signal in response thereto, and
means controlled by said control signal for determining the number of lineal elements occurring during the time said control signal is produced.

9. A method for determining the position of interference fringes in a linear fringe pattern composed of alternating light and dark portions, comprising
scanning said line pattern in sequence a selected number of times in a direction parallel to the lines of said pattern so as to effectively divide said pattern into a plurality of lineal elements, and
counting a consecutive number of said lineal elements having an average light intensity above a selected intensity level.

10. The method defined in claim 9 including counting a consecutive number of said lineal elements having an average light intensity below a selected intensity level.

11. The method defined in claim 10 including
producing an optical image of said linear fringe pattern on a television monitor,
applying marker signals to said monitor to be produced with the optical image of said linear fringe pattern to mark the beginning of the counting of each consecutive number of lineal elements, and
adjusting said selected intensity level as displayed by said marker signals on said monitor to change the beginning of said counting period for each consecutive number of lineal elements.

12. A method for measuring a linear interference fringe pattern composed of alternating light and dark lines comprising
projecting an image of said pattern onto the photosensitive target element of a television camera and scanning said target element a selected number of times in a direction parallel to the lines of said fringe pattern to produce video signals proportional to light intensity during the scanning of said target,
integrating the video signal from said camera for each line scan, and
counting the number of scan lines between changes in intensity level of said video signal from a selected value.

13. The invention defined in claim 12 including the step of successively comparing the integrated video signals with a selected reference level to produce binary signals respectively corresponding to the start of an interference fringe constituted by a dark line, and the start of a separation between interference fringes constituted by a light line.

14. The invention defined in claim 13 including the steps of
applying video signals from said camera to a television monitor,
generating line marker signals on each change of state of said bistable circuit, and
applying said line marker signals to said television monitor to cause a series of bright and dark spots to appear on the display screen of said television monitor on the next scanning line following a change of state of said bistable circuit.

15. The invention defined in claim 14 including the step of adjusting the said selected reference level when the bright and dark spots on a scan line of said television monitor indicates that the selected video level is incorrect.

* * * * *